United States Patent
Hu et al.

(10) Patent No.: US 9,459,647 B2
(45) Date of Patent: Oct. 4, 2016

(54) BANDGAP REFERENCE CIRCUIT AND BANDGAP REFERENCE CURRENT SOURCE WITH TWO OPERATIONAL AMPLIFIERS FOR GENERATING ZERO TEMPERATURE CORRELATED CURRENT

(75) Inventors: Min-Hung Hu, Hsinchu (TW); Zhen-Guo Ding, Tainan (TW); Chen-Tsung Wu, Kaohsiung (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 146 days.

(21) Appl. No.: 13/155,392

(22) Filed: Jun. 8, 2011

(65) Prior Publication Data

US 2012/0043955 A1 Feb. 23, 2012

(30) Foreign Application Priority Data

Aug. 18, 2010 (TW) .............................. 099127556 A

(51) Int. Cl.
*G05F 3/30* (2006.01)
*H02M 1/44* (2007.01)
*H02M 1/00* (2006.01)
*H02M 3/156* (2006.01)

(52) U.S. Cl.
CPC .................. *G05F 3/30* (2013.01); *H02M 1/44* (2013.01); *H02M 3/156* (2013.01); *H02M 2001/0003* (2013.01); *H02M 2001/0025* (2013.01)

(58) Field of Classification Search
CPC .................. H02M 1/44; H02M 3/156; H02M 2001/0025; H02M 2001/0003
USPC .................................................. 323/313–316
See application file for complete search history.

(56) References Cited

U.S. PATENT DOCUMENTS

| 6,906,581 | B2 * | 6/2005 | Kang | ........................ G05F 3/30 323/313 |
| 7,323,857 | B2 | 1/2008 | Sung | |
| 7,570,107 | B2 * | 8/2009 | Kim | ........................ G05F 3/30 323/313 |
| 7,737,782 | B1 * | 6/2010 | Sudou | ................. H03F 3/45233 330/253 |
| 2004/0090268 | A1 * | 5/2004 | Sanchez | ............. H03F 3/45192 330/253 |
| 2005/0012493 | A1 * | 1/2005 | Rosenthal | ...................... 323/313 |
| 2008/0106334 | A1 * | 5/2008 | Lee et al. | ....................... 330/253 |
| 2011/0050318 | A1 * | 3/2011 | Lee | ..................... H03F 3/45183 327/333 |

FOREIGN PATENT DOCUMENTS

| TW | 200827978 | 7/2008 |
| TW | 200944989 | 11/2009 |

* cited by examiner

*Primary Examiner* — Jue Zhang
*Assistant Examiner* — Lakaisha Jackson
(74) *Attorney, Agent, or Firm* — Winston Hsu; Scott Margo

(57) ABSTRACT

The present invention provides a bandgap reference circuit. The bandgap reference circuit includes a first bipolar junction transistor, a first resistor, for generating a proportional to absolute temperature current, a second resistor, for generating a complementary to absolute temperature current, a first operational amplifier, coupled with the first bipolar junction transistor and the first resistor, a second operational amplifier, coupled with the first bipolar junction transistor and the second resistor, and a zero temperature correlated current generator, for summing the proportional to absolute temperature current and the complementary to absolute temperature current, to generate a zero temperature correlated current.

9 Claims, 5 Drawing Sheets

BANDGAP REFERENCE CIRCUIT AND BANDGAP REFERENCE CURRENT SOURCE WITH TWO OPERATIONAL AMPLIFIERS FOR GENERATING ZERO TEMPERATURE CORRELATED CURRENT

BACKGROUND OF THE INVENTION

1. Field of the Invention

The present invention relates to a bandgap reference circuit and bandgap reference current source, and more particularly, to a bandgap reference circuit and bandgap reference current source with reduced layout area.

2. Description of the Prior Art

A stable reference voltage source or current source immune to temperature variation, e.g. a bandgap reference circuit, is usually applied in analog circuits to provide a reference voltage or reference current, for maintaining accurate operations of a power source or other circuits. In short, a bandgap reference current source sums a proportional to absolute temperature (PTAT) current and a complementary to absolute temperature (CTAT) current at a proper ratio, such that a PTAT component and a CTAT component are cancelled, generating a zero temperature correlated (zero-TC) current.

In detail, please refer to FIG. 1, which is a schematic diagram of a bandgap reference current source 10 in the prior art. The bandgap reference current source 10 includes a start-up circuit 100 and a bandgap reference circuit 102. The start-up circuit 100 activates operations of the bandgap reference circuit 102 when a system voltage VDD is greater than source-to-gate voltages of P-type metal oxide semiconductor (MOS) transistors 104, 106, i.e. VDD>2 VSG. As shown in FIG. 1, since input voltages VA, VB of positive and negative input terminals of an operational amplifier (OP) 108 are identical in the bandgap reference circuit 102, i.e. VA=VB=VEB1, a PTAT current Iptat can be generated from base-to-emitter voltages VEB1, VEB2 of BJTs Q1, Q2 and a resistor Rptat with a resistance R as shown in Eq. 1:

$$Iptat = \frac{VEB1 - VEB2}{R} = \frac{V_T \ln K}{R}, \quad \text{(Eq. 1)}$$

where K denotes that the BJT Q2 can be taken as K BJTs Q1 connected in parallel. Since a threshold voltage $V_T$ is PTAT, by referring to Eq. 1, the PTAT current Iptat carried by the resistor Rptat is also PTAT.

On the other hand, a CTAT current Ictat can be generated from the base-to-emitter voltage VEB1 of the BJT Q1 and a resistor Rctat with a resistance L*R as shown in Eq. 2:

$$I_{CTAT} = \frac{VEB1}{L*R}, \quad \text{(Eq. 2)}$$

where the CTAT current Ictat carried by the resistor Rctat is CTAT, since the base-to-emitter voltage VEB1 is CTAT. As a result, if the resistance L*R of the resistor Rctat is properly adjusted, a zero-TC current Iref can be generated by summing the PTAT current Iptat and the CTAT current Ictat as shown in Eq. 3:

$$Iref = Iptat + Ictat = \frac{V_T \ln K}{R} + \frac{VEB1}{L*R} \quad \text{(Eq. 3)}$$

-continued $$\frac{\partial Iref}{\partial T} = \frac{\ln K}{R} * \frac{\partial V_T}{\partial T} + \frac{1}{L*R} * \frac{\partial VEB1}{\partial T} = 0,$$

$$\Rightarrow L = -\frac{\frac{\partial VEB1}{\partial T}}{\frac{\partial V_T}{\partial T} \ln K} \approx -\frac{-1.6}{0.085 \ln K}$$

where a component of the base-to-emitter voltage VEB1 and a component of the threshold voltage $V_T$ after partial differential operations of time are −1.6 mv/C and 0.085 mv/C, respectively. Therefore, as can be seen from Eq. 3, when L=1.6/0.085 lnK, the zero-TC current Iref is zero-TC, and the zero-TC current Iref can be mirrored for output by current mirrors M1, M2, M3.

Please refer to FIG. 2A and FIG. 2B, which are schematic diagrams of the OP 108 shown in FIG. 1 optionally including an input pair of PMOS or NMOS transistors, respectively. When the OP 108 includes an input pair of PMOS transistors, the input voltages VA, VB of the input pair of the PMOS transistors Q3, Q4 are required to be less than VDD−VDS5−VSG3, and when the OP 108 includes an input pair of NMOS transistors, the input voltages VA, VB of the input pair of the NMOS transistors Q6, Q7 are required to be greater than VDS8+VGS7. Therefore, the input voltages VA, VB of the OP 108 including an input pair of PMOS transistors can be lower than those of the OP 108 including an input pair of NMOS transistors, such that power consumption of the BJTs Q1, Q2 shown in FIG. 1 can be reduced.

However, as shown in FIG. 1 and FIG. 2A, if the OP 108 includes an input pair of PMOS transistors, since the output voltage Vo equals the system voltage VDD minus a source-to-gate voltage VSGM1 of the current mirror M1, the input pair of the PMOS transistors will operate in linear region when the system voltage VDD rises, such that the OP 108 will not operate as expected. As a result, the OP 108 including an input pair of PMOS transistors can not be applied for a wider range of the system voltage VDD. In comparison, although the OP 108 including an input pair of NMOS transistors can be applied for a wider range of the system voltage VDD, the input voltages VA, VB can not be reduced, such that power consumption of the BJTs Q1, Q2 is increased.

Besides, in the bandgap reference current source 10, since the start-up circuit 100 starts operating when VDD>2 VGS, the start-up circuit 100 may not operate well due to process or temperature variation. In addition, the bandgap reference circuit 102 further needs to utilize a resistor with a resistance L*R to balance the CTAT current, wasting layout area. Thus, there is a need for improvement of the prior art.

SUMMARY OF THE INVENTION

It is therefore an objective of the present invention to provide a bandgap reference circuit and bandgap reference current source.

The present invention discloses a bandgap reference circuit with less layout area. The bandgap reference circuit includes a first bipolar junction transistor (BJT), comprising a first terminal and a second terminal coupled to a ground, a first resistor, for generating a proportional to absolute temperature (PTAT) current, a second BJT, comprising a first terminal coupled to the first resistor, and a second terminal and a third terminal coupled to a ground, a second resistor, having a resistance with a specific ratio to a resistance of the first resistor, for generating a complementary to absolute temperature (CTAT) current, a first operational amplifier (OP), comprising a first input terminal coupled to a third terminal of the first BJT, and a second input terminal coupled to the first resistor, a second OP, comprising a first input terminal coupled to the first BJT the third terminal, and a second input terminal coupled to the second resistor, and a zero temperature correlated (zero-TC) current generator, for summing the PTAT current and the CTAT current, to generate a zero-TC current.

The present invention further discloses a bandgap reference current source. The bandgap reference current source includes a bandgap reference circuit with less layout area, for generating a zero-TC current, and a start-up circuit, for activating the bandgap reference circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
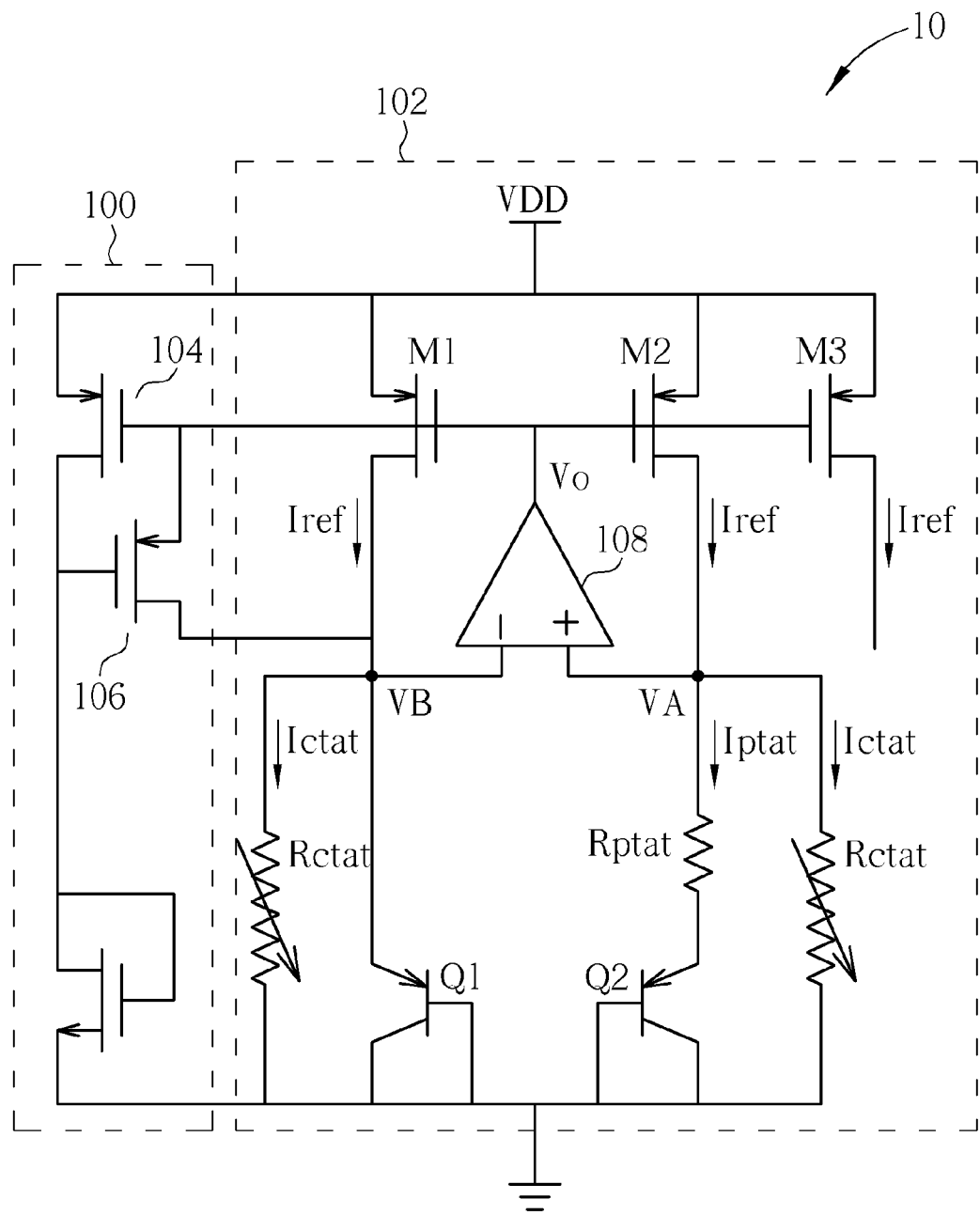
FIG. 1 is a schematic diagram of a bandgap reference current source in the prior art.
Figure 2B:
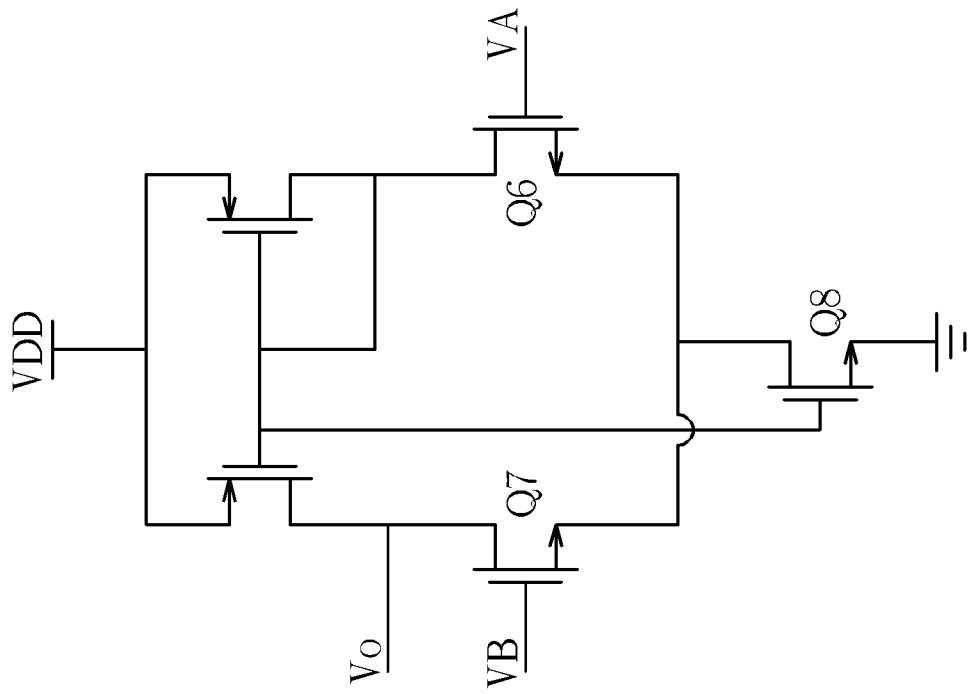
FIG. 2A and FIG. 2B are schematic diagrams of an OP shown in FIG. 1 optionally including an input pair of PMOS or NMOS transistors, respectively.
Figure 2A:
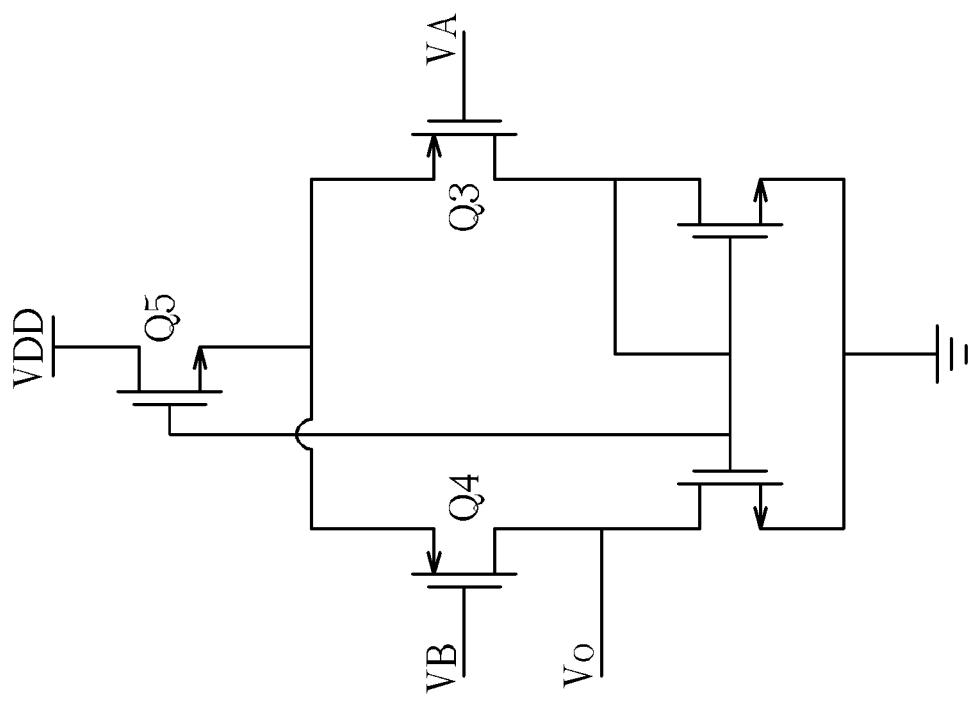
Figure 3:
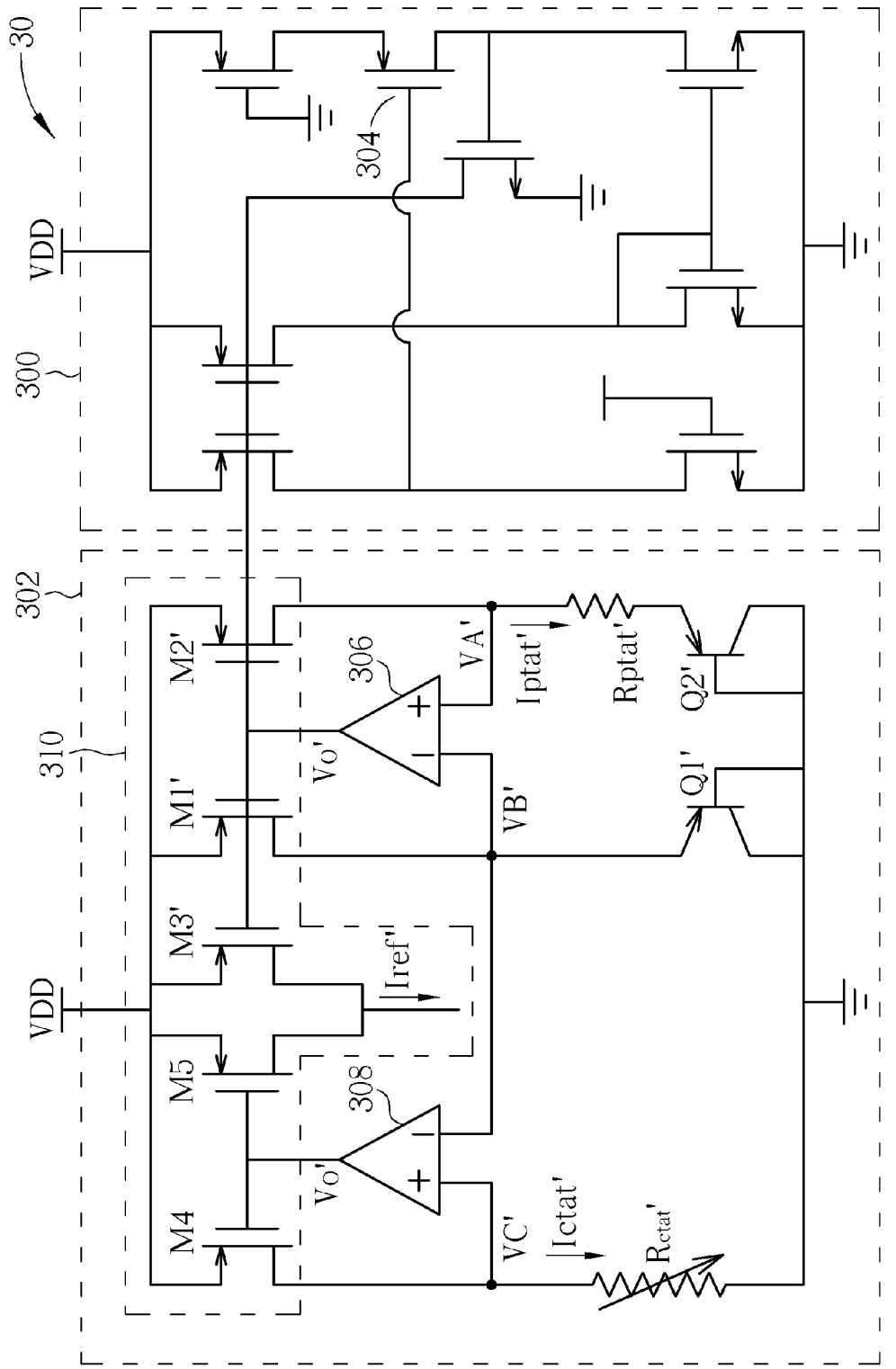
FIG. 3 is a schematic diagram of a bandgap reference current source according to an embodiment of the present invention.

Please refer to FIG. 3, which is a schematic diagram of a bandgap reference current source 30 according to an embodiment of the present invention. The bandgap reference current source 30 includes a start-up circuit 300 and a bandgap reference circuit 302. Compared with the start-up circuit 100, the start-up circuit 300 can activate operations of the bandgap reference circuit 302 when VDD>VSG, and the start-up circuit 300 further includes a PMOS transistor 304 utilized for gradually being turned off to avoid DC power consumption after the bandgap reference circuit 302 steadily outputs a zero temperature correlated (zero-TC) current Iref'. In the bandgap reference circuit 302, methods for generating a proportional to absolute temperature (PTAT) current Iptat' and a complementary to absolute temperature (CTAT) current Ictat' are similar to those of the bandgap reference circuit 102, and are not narrated hereinafter. Differences between the bandgap reference circuit 302 and the bandgap reference circuit 102 are that the bandgap reference circuit 102 only utilizes the OP 108 to generate the PTAT current Iptat and the CTAT current Ictat, while the bandgap reference circuit 302 utilizes OPs 306, 308 to generate the PTAT current Iptat' and the CTAT current Ictat', respectively. As a result, the bandgap reference circuit 302 does not need to utilize an extra resistor with a resistance L*R to balance the CTAT current, which reduces layout area.

In detail, since input voltages VA' and VB' of positive and negative input terminals of the OP 306 are the same as input voltages VC' and VB' of positive and negative input terminals of the OP 308, i.e. VA'=VB'=VC'=VEB1', it can be derived that the PTAT current Iptat' is PTAT by calculations similar to those of the prior art. The CTAT current Ictat' is generated by a voltage-current converter, i.e. the OP 308, a current mirror M4 and a resistor Rctat' combined, converting a CTAT voltage VC'=VEB1' into a CTAT current Ictat'. Thus, a zero-TC current generator 310 can utilize current mirrors M1', M2', M3' and current mirrors M4, M5 to mirror the PTAT current Iptat' and the CTAT current Ictat', respectively, so as to sum the PTAT current Iptat' and the CTAT current Ictat' and thus generate the zero-TC current Iref'. In comparison, the bandgap reference circuit 102 in the prior art needs the extra resistor Rctat for balancing the CTAT current Ictat, since the current mirrors M1, M2 and M3 simultaneously mirror the PTAT current Iptat and the CTAT current Ictat. As a result, the bandgap reference circuit 302 does not need to utilize an extra resistor with a resistance L*R to balance CTAT current, and thus requires less layout area.

Figure 4:
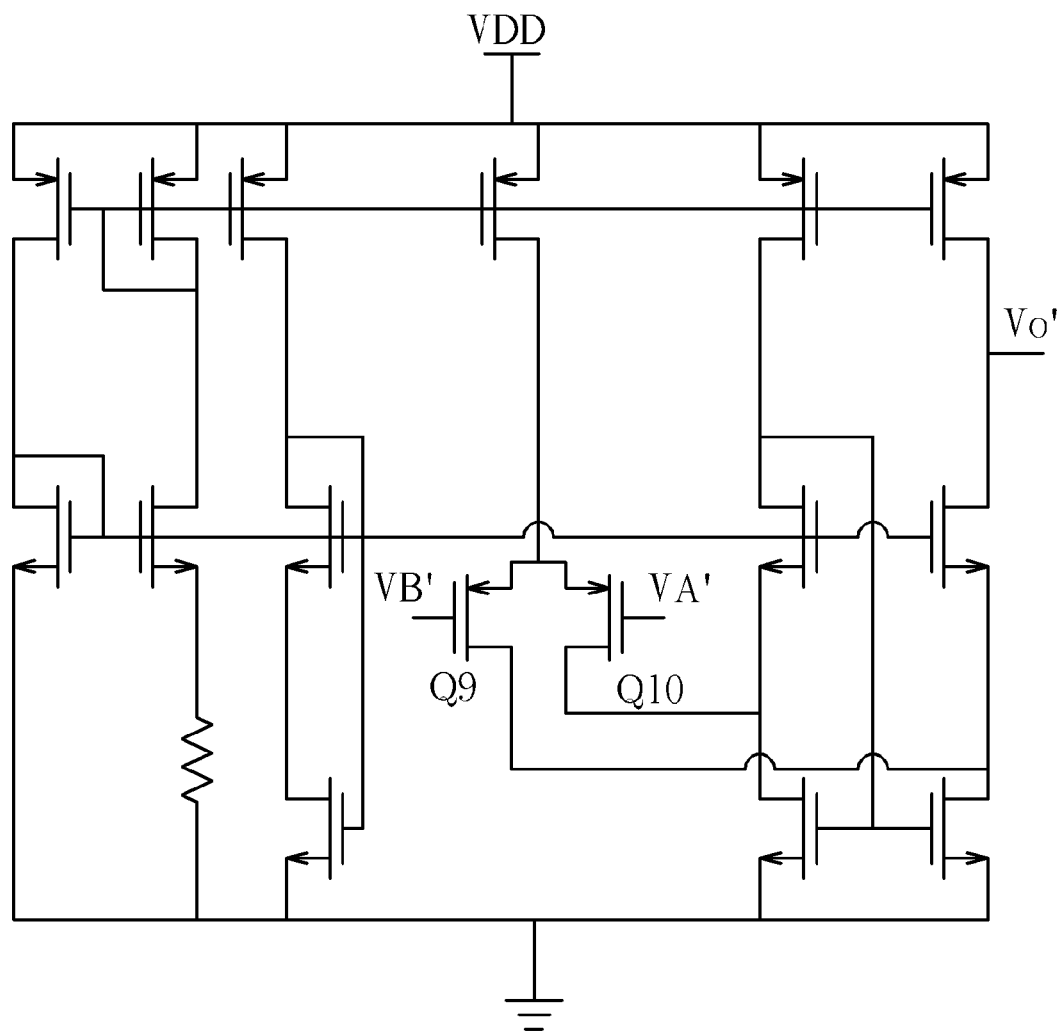
FIG. 4 is a schematic diagram of OPs shown in FIG. 3 according to an embodiment of the present invention.

Furthermore, please refer to FIG. 4, which is a schematic diagram of the OPs 306, 308 shown in FIG. 3 according to an embodiment of the present invention. As shown in FIG. 4, the OPs 306, 308 include an input pair of PMOS transistors Q9, Q10 and a folded-cascode structure. Therefore, lower input voltages VA', VB' can be applied for reducing power consumption of BJTs Q1' and Q2' shown in FIG. 3, and an output voltage Vo' can rise normally without affecting operations of the input pair of the PMOS transistors Q9, Q10 when the system voltage VDD rises, such that the OPs 306, 308 can be applied for a wider range of the system voltage VDD. As a result, the present invention can be applied for a wider range of the system voltage VDD with low power consumption.

Figure 5:
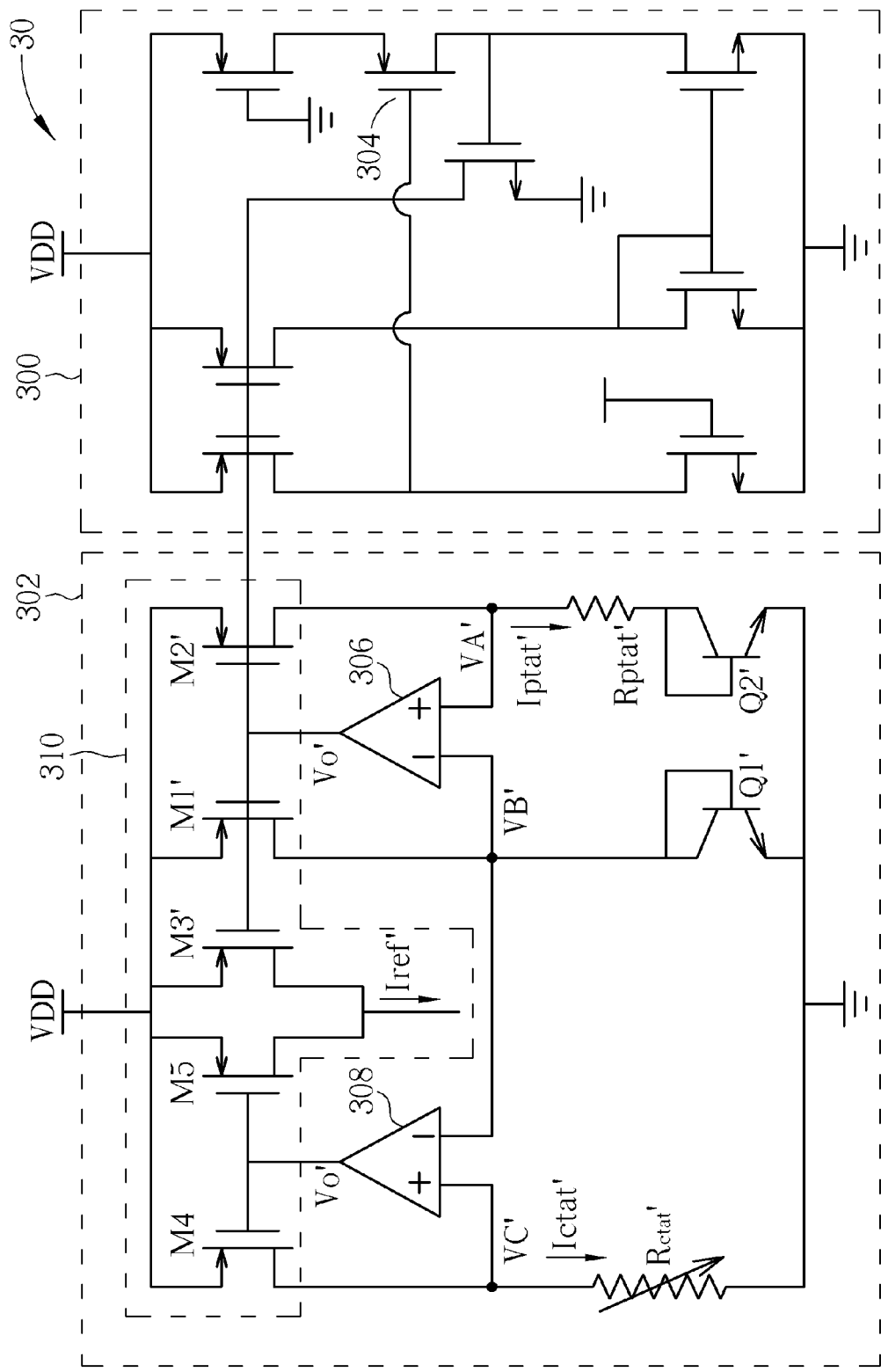
FIG. 5 is a schematic diagram of a bandgap reference current source according to another embodiment of the present invention.

Noticeably, the spirit of the present invention is to utilize the OPs 306, 308 to generate the PTAT current Iptat' and the CTAT current Ictat', respectively, so as to reduce layout area, wherein the OPs 306, 308 include an input pair of PMOS transistors and a folded-cascode structure, such that the bandgap reference circuit 302 can be applied for a wider range of the system voltage VDD with low power consumption. Those skilled in the art should make modification or alterations accordingly. For example, components of the present invention can be applied as a whole or separately, to achieve respective effects. That is, even if the OPs 306, 308 of the bandgap reference circuit 302 do not include an input pair of PMOS transistors and a folded-cascode structure as mentioned above, layout area can still be reduced, and if the OP 108 of the bandgap reference circuit 102 includes an input pair of PMOS transistors and a folded-cascode structure, the bandgap reference circuit 102 can be applied for a wider range of the system voltage VDD with low power consumption as well. Besides, circuits of the start-up circuit 100 and the zero-TC current generator 310 are not limited to the embodiment of the present invention, as long as functions of the start-up circuit 100 and the zero-TC current generator 310 can be achieved. Furthermore, the BJTs Q1' and Q2' are realized by PNP BJTs as shown in FIG. 3, but can also be realized by NPN BJTs as shown FIG. 5 as long as the structure are correspondingly modified.

In the prior art, since the current mirrors M1, M2 and M3 simultaneously mirror the PTAT current Iptat and the CTAT current Ictat, the extra resistor Rctat is required for balancing the CTAT current Ictat; and, if the OP 108 includes an input pair of PMOS transistors, the power consumption of the BJTs Q1 and Q2 can be reduced, but the OP 108 can not be applied for a wider range of the system voltage VDD, whereas if the OP 108 includes an input pair of NMOS transistors, the OP 108 can be applied for a wider range of the system voltage VDD, but the power consumption of the BJTs Q1 and Q2 is high. In comparison, the present invention utilizes the current mirrors M1', M2', M3' and the current mirrors M4, M5 to mirror the PTAT current Iptat' and the CTAT current Ictat' respectively, so as to sum the PTAT current Iptat' and the CTAT current Ictat' and thus generate the zero-TC current Iref'. Therefore, the present invention does not need to utilize an extra resistor with a resistance L*R to balance CTAT current, and thus requires less layout area. Besides, the OPs 306, 308 include an input pair of PMOS transistors and a folded-cascode structure, such that the bandgap reference circuit 302 can be applied for a wider range of the system voltage VDD with low power consumption.

To sum up, the bandgap reference current source of the present invention requires less layout area, and can be applied for a wider range of a system voltage with low power consumption.

Those skilled in the art will readily observe that numerous modifications and alterations of the device and method may be made while retaining the teachings of the invention.

What is claimed is:

1. A bandgap reference circuit with reduced layout area and reduced power consumption, comprising:
   a first bipolar junction transistor, comprising a first terminal and a second terminal coupled to a ground;
   a first resistor, for generating a proportional to absolute temperature current;
   a second bipolar junction transistor, comprising a first terminal coupled to the first resistor, and a second terminal and a third terminal coupled to the ground;
   a second resistor, having a resistance at a specific ratio to a resistance of the first resistor, for generating a complementary to absolute temperature current;
   a first operational amplifier, comprising a first input terminal coupled to a third terminal of the first bipolar junction transistor, and a second input terminal coupled to the first resistor;
   a second operational amplifier, comprising a first input terminal coupled to the third terminal of the first bipolar junction transistor, and a second input terminal coupled to the second resistor; and
   a zero temperature correlated current generator, for summing the proportional to absolute temperature current and the complementary to absolute temperature current to generate a zero temperature correlated current;
   wherein each of the first operational amplifier and the second operational amplifier does not comprise an input pair of N-type metal oxide semiconductor transistors and comprises an input pair of P-type metal oxide semiconductor transistors and a folded cascode structure for adapting a wide range of a system voltage, and the input pair of P-type metal oxide semiconductor transistors receives input voltages from outside of the each of the first operational amplifier and the second operational amplifier;
   wherein the power consumption of the first bipolar junction transistor and the second bipolar junction transistor is reduced by applying the input pair of P-type metal oxide semiconductor transistors and the folded cascode structure.

2. The bandgap reference circuit of claim 1, wherein the first bipolar junction transistor and the second bipolar junction transistor-are PNP or NPN bipolar junction transistors.

3. The bandgap reference circuit of claim 1, wherein voltages of the first input terminal and the second input terminal of the first operational amplifier and voltages of the first input terminal and the second input terminal of the second operational amplifier are identical to a collector-to-emitter voltage of the first bipolar junction transistor.

4. The bandgap reference circuit of claim 1, wherein the zero temperature correlated current generator comprises:
   a first current mirror, for mirroring the complementary to absolute temperature current;
   a second current mirror, for mirroring the proportional to absolute temperature current; and
   a summing unit, coupled to the first current mirror and the second current mirror, for generating the zero temperature correlated current.

5. A bandgap reference current source, comprising:
   a bandgap reference circuit with reduced layout area and reduced power consumption, for generating a zero temperature correlated current; and
   a start-up circuit, for activating the bandgap reference circuit;
   wherein the bandgap reference circuit comprises:
      a first bipolar junction transistor, comprising a first terminal and a second terminal coupled to a ground;
      a first resistor, for generating a proportional to absolute temperature current;
      a second bipolar junction transistor, comprising a first terminal coupled to the first resistor, and a second terminal and a third terminal coupled to the ground;
      a second resistor, having a resistance at a specific ratio to a resistance of the first resistor, for generating a complementary to absolute temperature current;
      a first operational amplifier, comprising a first input terminal coupled to a third terminal of the first bipolar junction transistor, and a second input terminal coupled to the first resistor;
      a second operational amplifier, comprising a first input terminal coupled to the third terminal of the first bipolar junction transistor, and a second input terminal coupled to the second resistor; and
      a zero temperature correlated current generator, for summing the proportional to absolute temperature current and the complementary to absolute temperature current, to generate a zero temperature correlated current;
   wherein each of the first operational amplifier and the second operational amplifier does not comprise an input pair of N-type metal oxide semiconductor transistors and comprises an input pair of P-type metal oxide semiconductor transistors and a folded cascode structure for adapting a wide range of a system voltage, and the input pair of P-type metal oxide semiconductor transistors receives input voltages from outside of the each of the first operational amplifier and the second operational amplifier;
   wherein the power consumption of the first bipolar junction transistor and the second bipolar junction transistor is reduced by applying the input pair of P-type metal oxide semiconductor transistors and the folded cascode structure.

6. The bandgap reference current source of claim 5, wherein the zero temperature correlated current generator comprises:
   a first current mirror, for mirroring the complementary to absolute temperature current;
   a second current mirror, for mirroring the proportional to absolute temperature current; and a summing unit, coupled to the first current mirror and the second current mirror, for generating the zero temperature correlated current.

7. The bandgap reference current source of claim 5, wherein the first bipolar junction transistor and the second bipolar junction transistor are PNP or NPN bipolar junction transistors.

8. The bandgap reference current source of claim 5, wherein the start-up circuit further comprises a switch, for being gradually turned off to avoid DC power consumption after the bandgap reference circuit reaches a steady state.

9. The bandgap reference current source of claim 5, wherein voltages of the first input terminal and the second input terminal of the first operational amplifier and voltages of the first input terminal and the second input terminal of the second operational amplifier are identical to a collector-to-emitter voltage of the first bipolar junction transistor.

* * * * *